US006282356B1

(12) United States Patent
Johnston, Jr. et al.

(10) Patent No.: US 6,282,356 B1
(45) Date of Patent: Aug. 28, 2001

(54) OPTICAL WAVEGUIDE DEVICE WITH ENHANCED STABILITY

(75) Inventors: Wilbur Dexter Johnston, Jr., Mendham Township, Morris County, NJ (US); William James Minford, Lehigh Township, Northampton County; John William Osenbach, Kutztown, both of PA (US)

(73) Assignee: Agere Systems Optoelectronics Guardian Corp., Orlando, FL (US)

( * ) Notice: Subject to any disclaimer, the term of this patent is extended or adjusted under 35 U.S.C. 154(b) by 0 days.

(21) Appl. No.: 09/287,683

(22) Filed: Apr. 7, 1999

(51) Int. Cl.[7] ............................... G02B 1/00; G02B 6/10; B29D 11/00

(52) U.S. Cl. ............................... 385/129; 427/573

(58) Field of Search .................... 385/129, 2, 8, 385/130; 359/345; 427/573

(56) References Cited

FOREIGN PATENT DOCUMENTS

| 0 553 568 A1 | 12/1992 | (EP) | ............................... G02F/1/035 |
| 0893515 | * 1/1999 | (EP) . | |

OTHER PUBLICATIONS

European Patent Search 00302815.6–2205 dated Aug. 8, 2000.
Nagata et al., "Improved Long–Term DC Drift in OH–Reduced Lithium Niobate Optical Intensity Modulators", Optics & Photonics News, vol. 7, Enginnering & Laboratory Notes (1996).
Kiode et al., "Prevention Of Thermal Degradation by Using Dehydrated $LiNbO_3$ Crystal," Jpn. J. App. Phy., vol. 33, pp. L957–L958 (1994).
Minikata et al., "DC Drift Free Ti Diffused $LiNbO_3$ Optical Modulators," Bulletin of the Research Institute of Electronics, vol. 30, pp. 209–212 (1995).
Standifer et al., "Chemically Reduced Lithium Niobate Single Crystals . . . ", IEEE Frequency Control Symposium, May 27–29, 1998, pp. 470 to 472.

* cited by examiner

Primary Examiner—Jon Henry
(74) Attorney, Agent, or Firm—Lester H. Birnbaum

(57) ABSTRACT

The invention is an optical waveguide device and a method for forming the device which provides enhanced stability. The device includes a pyroelectric substrate such as lithium niobate where the bulk resistivity of at least a portion of the substrate is reduced to $10^{13}$ ohm cm or less by heating the substrate in a reducing atmosphere. This causes the substrate to be less susceptible to temperature variants which can otherwise result in dc bias drift and variation.

26 Claims, 3 Drawing Sheets

OPTICAL WAVEGUIDE DEVICE WITH ENHANCED STABILITY

FIELD OF THE INVENTION

This invention relates to optical waveguide devices such as lithium niobate devices.

BACKGROUND OF THE INVENTION

Optical waveguide devices typically employ lithium niobate ($LiNbO_3$) or lithium tantalate ($LiTaO_3$) substrates with a defined waveguide path, and bias electrodes formed over the substrate. They may also include a buffer oxide between the electrodes and substrate. An electrical bias supplied to the electrodes alters the index of refraction of the waveguide path so that the device may be employed as a high speed optical switch, modulator, attentuator or other type of optical device.

For proper operation of such devices, it is highly desirable that a dc electric field bias be maintained in the waveguide for extended times and varying temperatures. Therefore, long term bias stability is a critical concern. Most approaches to providing bias stability have involved reducing OH or proton concentration on the lithium niobate substrate (Nagata et al "Improved Long Term Drift in OH-Reduced Lithium Niobate Optical Intensity Modulators", Optics & Photonics News, vol. 7, Engineering & Laboratory Notes (1996) and Koide, et al "Prevention of Thermal Degradation by Using Dehydrated $LiNbO_3$ Crystal" Jpn. J. App Phy., vol. 33, pp. L957–L958 (1994)), removal of a damaged layer from the surface of the lithium niobate substrate (Minikata et al, "DC Drift Free Ti Diffused $LiNbO_3$ Optical Modulators" Bulletin of the Research Institute of Electronics, vol. 30, pp. 209–212 (1995)), or modification of the composition of the buffer layer (EP 0 553 568 A1). Such approaches appear effective in eliminating long term drift. However, pyroelectric material, such as lithium niobate and lithium tantalate, is also sensitive to temperature variations. That is, temperature variations induce charge build-up at the surfaces of the substrate, and this build-up generally requires an increasing bias to achieve the desired modulation. The above solutions do not deal with bias instability due to such temperature variations.

One approach to the instability problem is to provide a semi-insulation charge dissipation layer, such as partially oxidized polysilicon or Ti/Si/N, over the substrate. We have found, however, that the effectiveness of this charge dissipation layer can degrade under bias over a period of time, thus limiting its effectiveness.

It has also been suggested that lithium niobate material used for surface acoustic wave devices can be treated by heating in a forming gas (10 percent $H_2$, 90 percent $N_2$) for one hour at temperatures in the range 400–750 deg C. (see Standifer et al "Chemically Reduced Lithium Niobate Single Crystals . . . " IEEE Frequency Control Symposium, May 27–29, 1998, pp. 470 to 472.) This is done to suppress sparking during processing and operation as well as reduce optical reflections during photolithographic processing of the device.

SUMMARY OF THE INVENTION

The invention in accordance with one aspect is an optical waveguide device including a substrate comprising a pyroelectric crystal, where the bulk resistivity of at least a portion of the substrate is no greater than $10^{13}$ ohm cm. In accordance with another aspect, the invention is a method of forming an optical waveguide device including the steps of providing a substrate comprising a pyroelectric crystal having a certain bulk resistivity, and heating the substrate in a reducing atmosphere for a time and temperature sufficient to reduce the bulk resistivity to no greater than $10^{13}$ ohm cm.

BRIEF DESCRIPTION OF THE FIGURES

These and other features of the invention are delineated in detail in the following description. In the drawing.

It will be appreciated that, for purposes of illustration, these figures are not necessarily drawn to scale.

DETAILED DESCRIPTION

Figure 1:
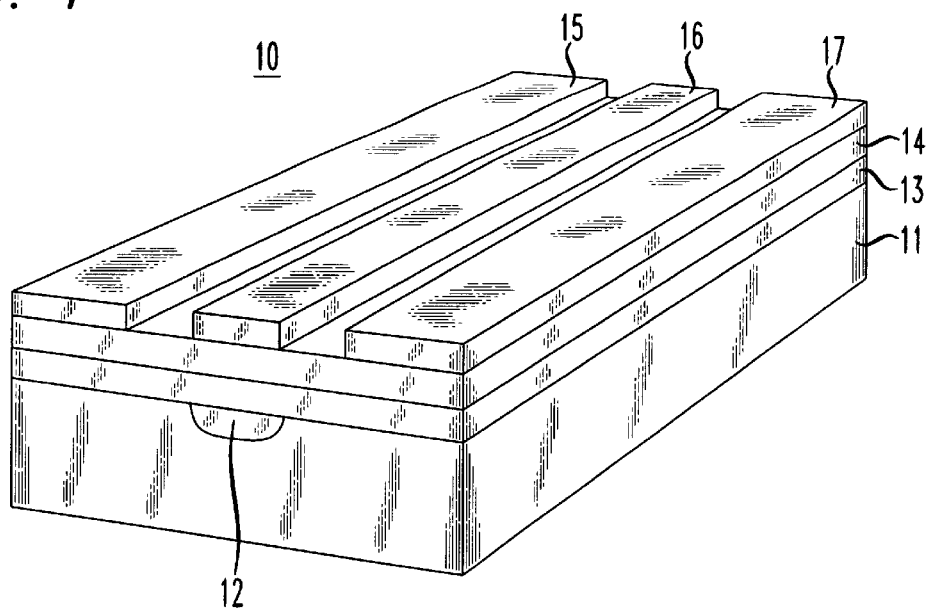
FIG. 1 is a perspective view of a typical waveguide device which incorporates the present invention in accordance with one embodiment.

FIG. 1 illustrates a typical optical modulator, 10, which can benefit from the present invention. The modulator includes a substrate, 11, comprising lithium niobate ($LiNbO_3$) which is typically approximately 1 mm thick and approx. 5×50 mm in size. While a lithium niobate substrate is described in this example, it will be appreciated that the invention is advantageous for any pyroelectric crystal. The optical waveguide path, 12, is formed in the substrate, 11, usually by diffusion of titanium through a major surface. Deposited on the major surface of the substrate is a buffer layer, 13, which is a transparent dielectric layer having a refractive index less than that of the substrate. The layer, 13, typically comprises silicon dioxide doped with $In_2O_3$ and $TiO_2$. A charge dissipation layer, 14, is deposited over the buffer layer, 13. Electrodes, 15,16, and 17, are deposited over the dissipation layer. As known in the art, an electrical bias supplied to the electrodes varies the index of refraction of the waveguide path, 12, thereby modulating the intensity of any optical signal propagating through the path.

Figure 6:
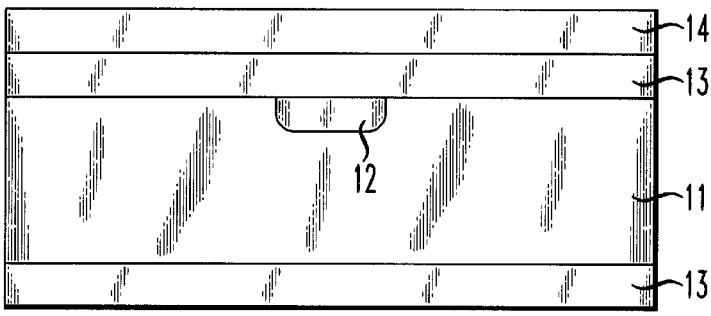
Figure 7:
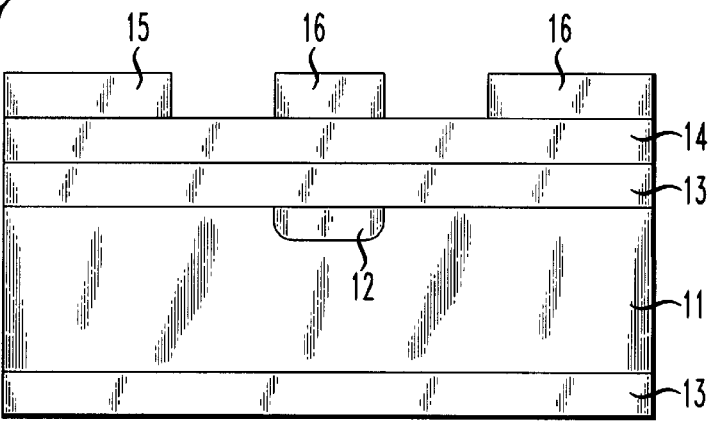
Figure 8:
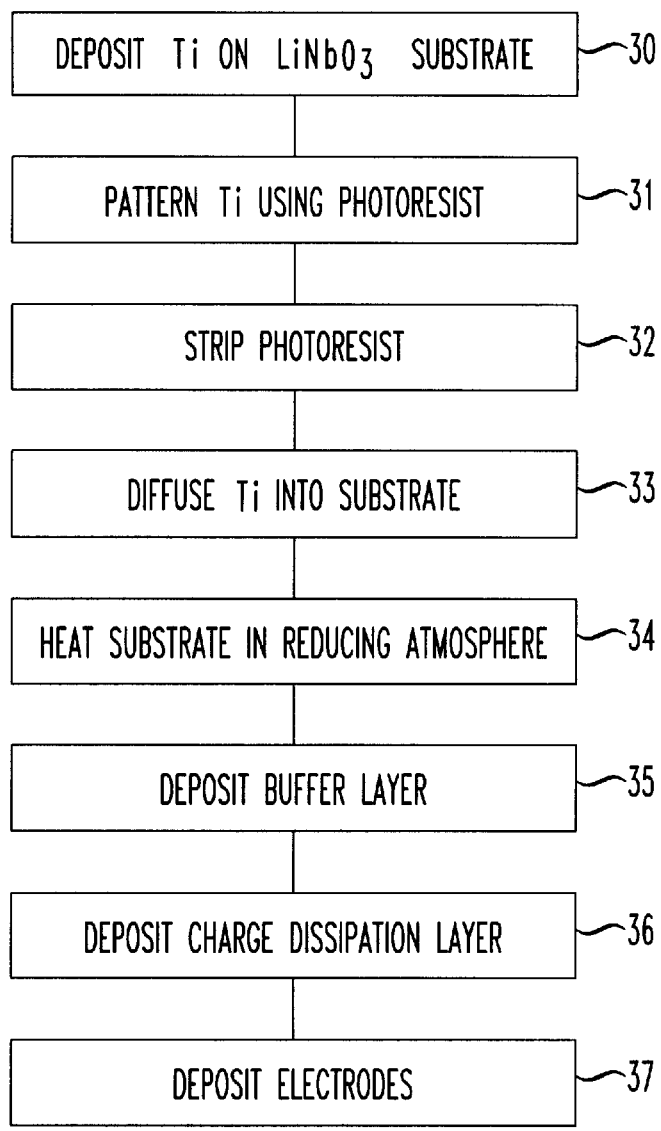
FIG. 8 is a flow diagram illustrating the method aspects of the invention in accordance with one embodiment.

FIGS. 2–7 and the flow diagram of FIG. 8 illustrate a typical processing sequence for producing the device of FIG. 1. It will be appreciated that several devices are fabricated from a single wafer, and only the portion of the wafer forming a single device is shown.

Figure 2:
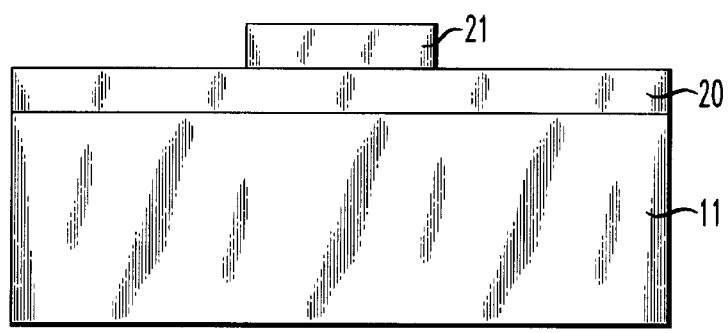
FIGS. 2–7 are end views of the device during various stages of fabrication in accordance with the same embodiment.
Figure 3:
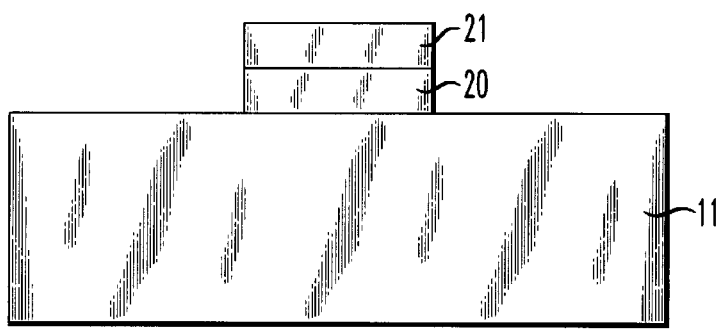
Figure 4:
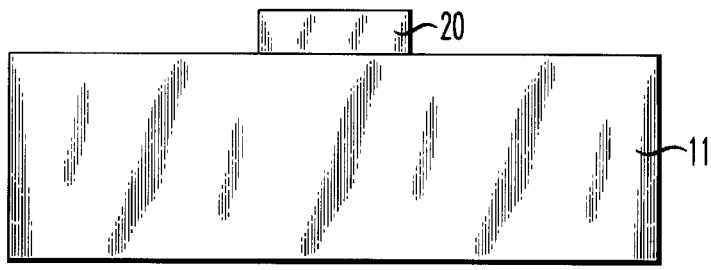

The processing starts with a substrate, 10, comprising $LiNbO_3$ having an initial bulk resistivity of typically $5-10^{14}$ ohm-cm or greater at room temperature. As illustrated in FIG. 2 and by step 30 in FIG. 8, a layer, 20, of metal typically comprising titanium is deposited on the major surface of the substrate, 10, by standard techniques such as e-beam evaporation. A photoresist layer, 21 is deposited on the titanium layer and patterned by standard photolithographic techniques in order to expose the areas where titanium is not desired in the substrate. As illustrated in FIG. 3 and step 31 of FIG. 8, the exposed titanium is etched away. This is followed by stripping off the remaining photoresist, as illustrated in FIG. 4 and step 32 of FIG. 8.

Figure 5:
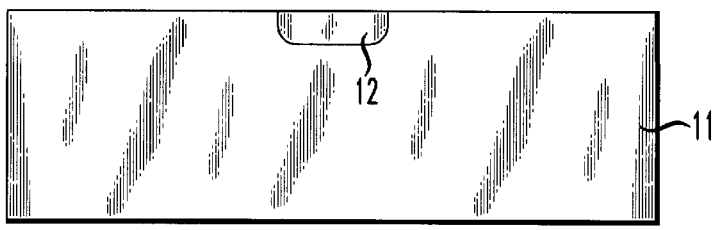

Next, as illustrated in FIG. 5, and step 33, the remaining titanium is diffused into the substrate, 10, to form the waveguide path, 12. This diffusion is typically performed in air at a temperature of approximately 1000 deg C for a time of approximately 12 hours.

Next, as illustrated by step 34, the substrate is heated in a reducing atmosphere. The purpose of this step is to reduce the bulk resistivity of the substrate to a value of $10^{13}$ ohm cm or less. Applicants have discovered that by reducing the resistivity, the substrate is less susceptible to temperature variants. That is, the dc bias applied to the device can remain fairly constant over a wide temperature range (−40 to 85 deg C) in spite of temperature transients within that range without significantly affecting the desired modulation of the signal propagating through the waveguide path, 12. While not being bound by any theory, it is believed that the reduction in bulk resistivity reduces the dielectric relaxation time of the substrate crystal and, therefore, does not allow substantial charge to be accumulated at the surfaces due to the pyroelectric effect which would otherwise affect the modulation. In particular, a resistivity of $10^{13}$ ohm cm produces a relaxation time of approximately 30 minutes as compared to a relaxation time of 30 hours for a crystal with a resistivity of $5 \times 10^{14}$ ohm cm. Excessive reduction of resistivity should generally be avoided since the crystal becomes increasingly opaque and lossy. It is believed that a useful range of bulk resistivity is $10^{11}$ to $10^{13}$ ohm cm, and a preferred range is $3 \times 10^{12}$ to $10^{13}$ ohm cm.

The desired bulk resistivity of $10^{13}$ ohm cm can be achieved, for example, by heating in a reducing atmosphere comprising dry nitrogen or forming gas (hydrogen and nitrogen) or vacuum at a temperature of 500 deg C for a period of approximately 1 hour. In general, temperatures in the range 350 to 800 deg C for times of 10 minutes to 10 hours may be employed. This heating step is preferably performed after the Ti diffusion step (step33) and before the formation of the buffer layer (step 35), but can also be employed at other times.

As illustrated in FIG. 6 and step 35, a buffer layer, 13, is formed on the top and bottom surfaces of the substrate, 11. This step is usually performed by sputtering at a temperature of less than 150 deg C in an atmosphere of argon and oxygen for a period of approximately 10–20 hours, followed by an annealing at a temperature of approximately 500 deg C in an atmosphere comprising moist air for a period of approximately 5 hours. It will be noted that these temperatures are not sufficient to raise the bulk resistivity of the substrate above the desired range due to the presence of the buffer layer which protects the surfaces from oxidation. In general, sputtering times in the range 6 to 20 hours, and anneal temperature in the range 450–600 deg C for a time of 3 to 24 hours may be employed.

Next (step 36), the charge dissipation layer, 14, is formed on the buffer layer, 13, which is on the top surface of the substrate. The charge dissipation layer usually comprises Ti/Si/N and is typically formed by sputtering at a temperature in the range 20 to 150 deg C for a period of 0.5 to 5 hours.

As illustrated in FIG. 7, and step 37 of FIG. 8, the electrodes, 15, 16, and 17, are formed on the charge dissipation layer, 14, and defined in the appropriate pattern to complete the device. Electrode formation can be done by standard techniques such as evaporation, photolithography and electroplating.

Figure 9:
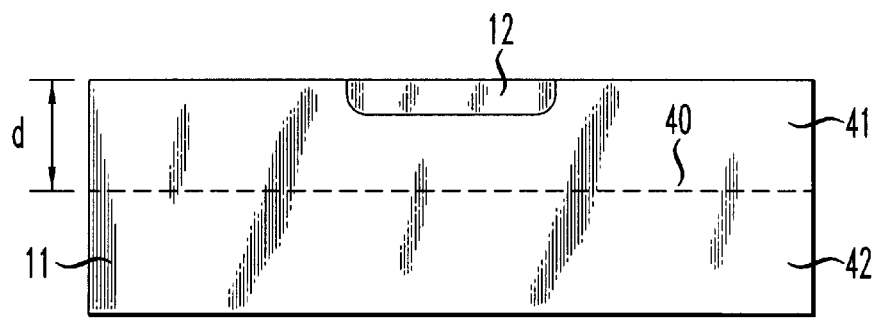
FIG. 9 is an end view of the device in accordance with alternative embodiments of the invention.

While the above-described embodiment has involved reducing the bulk resistivity of the substrate through its entire depth, it will be appreciated that reducing resistivity for only a portion of its depth may also be advantageous. Such embodiments are illustrated in the end view of FIG. 9, where elements similar to the previous figures are similarly numbered. Specifically, dashed line 40 represents the boundary between two regions, 41 and 42, of the substrate, 11, having different bulk resistivities. The boundary will desirably be formed at a depth, d, below that of the diffused region, 12, for example, a depth of approximately 30 μm. In one embodiment, the bulk resistivity of the upper region, 41, is reduced to $10^{13}$ ohm-cm or less by exposing the substrate surface to a reducing atmosphere as previously described, but for a shorter period of time, e.g., 5–15 minutes at 500 deg C. This leaves the remaining region, 42, at the original resistivity of the substrate, e.g., $5-10^{14}$ ohm-cm.

In an alternative embodiment, the upper region, 41, could have a resistivity comparable to the initial resistivity of the substrate, e.g., $5-10^{14}$ ohm-cm, while the lower region, 42, has the reduced resisitivty of $10^{13}$ ohm-cm or less. This structure can be formed by first exposing the substrate to the reducing atmosphere as previously described, and then exposing the substrate to an oxidizing atmosphere so that only the upper portion is reconverted to a resistivity of greater than $10^{13}$ ohm-cm (e.g., $5-10^{14}$ ohm-cm). This oxidation can be performed, for example, at a temperature in the range 500–1000 deg C for a time of 10 minutes to 24 hours.

It will also be appreciated that there may not be a sharp boundary, 40, between the regions of different restrictions. Rather, the resistivity may be graded.

Various additional modifications of the invention will become apparent to those skilled in the art. For example, although a lithium niobate substrate is described, the invention may be employed with any pyroelectric crystal such as $LiTaO_3$, $BaNaNb_2O_5$, and $KTaNbO_3$ having a similar relationship of electrical conductivity to oxidation/reduction of the oxide crystal. Further, although an optical modulator has been described, the invention may be employed in any optical waveguide device employing a pyroelectric crystal, such as attenuators, optical switches, and polarization controls and scramblers.

What is claimed is:

1. An optical waveguide device including a substrate comprising a pyroelectric crystal, where the bulk resistivity of at least a portion of the substrate is no greater than $10^{13}$ ohm cm.

2. The device according to claim 1 wherein the substrate is selected from the group consisting of $LiNbO_3$ and $LiTaO_3$.

3. The device according to claim 1 wherein the bulk resistivity is within the range $10^{11}$ to $10^{13}$ ohm cm.

4. The device according to claim 1 wherein the bulk resistivity is within the range $3 \times 10^{12}$ to $10^{13}$ ohm cm.

5. The device according to claim 1 wherein the device is an optical modulator.

6. The device according to claim 1 further comprising a buffer layer on at least one major surface of the substrate.

7. The device according to claim 6 further comprising a charge dissipation layer on the buffer layer.

8. The device according to claim 1 wherein the waveguide comprises a region of diffused material.

9. The device according to claim 8 wherein the diffused material comprises titanium.

10. The device according to claim 1 further comprising electrodes formed over the substrate so as to affect the index of refraction of the waveguide when an electrical bias is supplied thereto.

11. The device according to claim 1 wherein the substrate has a depth, and the bulk resistivity is no greater than $10^{13}$ ohm cm for the entire depth.

12. The device according to claim 1, wherein the substrate has a depth, and only a portion of the depth has a bulk resistivity of no greater than $10^{13}$ ohm cm.

13. A method of forming an optical waveguide device including the steps of providing a substrate comprising a pyroelectric crystal having a certain bulk resistivity, and heating the substrate in a reducing atmosphere for a time and temperature sufficient to reduce at least a portion of the bulk resistivity to no greater than $10^{13}$ ohm cm.

14. The method according to claim 13 wherein the resistivity is reduced to a range of $10^{11}$ to $10^{13}$ ohm cm.

15. The method according to claim 13 wherein the resistivity is reduced to a range of $3 \times 10^{12}$ to $10^{13}$ ohm cm.

16. The method according to claim 13 wherein the substrate is heated at a temperature in the range 350 to 800 deg C for a period within the range 10 minutes to 10 hours.

17. The method according to claim 13 further comprising the steps of diffusing a material into the substrate to form the waveguide, and forming a buffer layer on at least one major surface of the substrate.

18. The method according to claim 17 wherein the heating to reduce bulk resistivity is done after the diffusion and before the formation of the buffer layer.

19. The method according to claim 18 wherein the buffer layer is formed by sputtering at a temperature of less than 150 deg C in an atmosphere of argon and oxygen for a period of approximately 6–20 hours, followed by an annealing at a temperature in the range of 450–600 deg C in an atmosphere comprising air for a period of 3–24 hours.

20. The method according to claim 13 wherein the substrate has a depth and is heated for a time and temperature sufficient to reduce the bulk resistivity of the entire depth of the substrate.

21. The method according to claim 13 wherein the substrate has a depth, and the substrate is heated for a time and temperature sufficient to reduce only a portion of the depth to a resistivity of no greater than $10^{13}$ ohm cm.

22. The method according to claim 13 where the substrate has a surface, and further comprising heating the substrate in an oxidizing, atmosphere so that only a portion of the substrate removed from the surface has a bulk resistivity of no greater than $10^{13}$ ohm cm.

23. The device according to claim 12 wherein the waveguide comprises a region of diffused material, and wherein the bulk resistivity of no greater than $10^{13}$ ohm cm extends to a depth past the waveguide.

24. The device according to claim 12 wherein the substrate has a surface, and the waveguide comprises a region of diffused material, and wherein the bulk resisistivity of no greater than $10^{13}$ ohm cm is at a portion of the substrate beginning at a depth below the waveguide.

25. The method according to claim 21 wherein the waveguide comprises a region of diffused material, and the substrate is heated so that the portion reduced to a bulk resistivity of no greater than $10^{13}$ ohm cm extends to a depth past the waveguide.

26. The method according to claim 22 wherein the waveguide comprises a region of diffused material, and the substrate is heated in an oxidizing atmosphere so that the portion reduced to a bulk resistivity of no greater than $10^{13}$ ohm cm begins at a depth past the waveguide.

* * * * *